United States Patent [19]

Reinartz

[11] 4,416,490
[45] Nov. 22, 1983

[54] PRESSURE CONTROL VALVE FOR A HYDRAULIC BRAKE SYSTEM

[75] Inventor: Hans D. Reinartz, Frankfurt am Main, Fed. Rep. of Germany

[73] Assignee: ITT Industries, Inc. New York, N.Y. Chicago, IL 60606

[21] Appl. No.: 317,718

[22] Filed: Nov. 3, 1981

[30] Foreign Application Priority Data

Dec. 15, 1980 [DE] Fed. Rep. of Germany ....... 3046781

[51] Int. Cl.³ .......................... B60T 8/26; B60T 11/34
[52] U.S. Cl. ..................................... 303/6 C; 188/349
[58] Field of Search ............ 303/6 C, 6 R, 6 A, 22 R, 303/22 A, 68-69, 84 R; 188/349; 137/102; 60/591

[56] References Cited

U.S. PATENT DOCUMENTS 3,423,936 1/1969 Stelzer ............................... 303/6 C
3,508,792 4/1970 Bueler ............................... 303/6 C

FOREIGN PATENT DOCUMENTS 2089454 6/1982 United Kingdom ............... 303/6 C

Primary Examiner—Douglas C. Butler

Attorney, Agent, or Firm—James B. Raden; Marvin M. Chaban

[57] ABSTRACT

In a pressure control valve for a hydraulic brake system for vehicles, the closure member is carried by a control piston which has one of its ends guided through an annular seal and in a housing bore, which is preferably connected to atmosphere, and carries adjacent its other end a support plate for engagement with a valve spring. The valve seat is part of an annular body encircling the control piston and held in place by a tubular body surrounding the annular body and the control piston and secured to the housing. A return channel is formed between the annular body and the tubular body and incorporates therein a check valve opening in the direction from the outlet chamber to the inlet chamber. The annular seal is in abutment with a step in the housing and the annular body is in abutment with an inner flange of the tubular body. To obtain a minimum possible overall axial length, the annular body and the annular seal are arranged adjacent each other, leaving a clearance for radial channels. An elastic profile ring serves both as a valve seat and as a closure member of the check valve. The profile ring may be formed separate from or integral with the annular seal.

15 Claims, 4 Drawing Figures

PRESSURE CONTROL VALVE FOR A HYDRAULIC BRAKE SYSTEM

BACKGROUND OF THE INVENTION

The present invention relates to a pressure control valve for a hydraulic brake system for vehicles comprising a closure member carried by a control piston which has one of its ends guided through an annular seal and in a housing bore, preferably connected to atmosphere, and carried adjacent its other end a support plate for engagement with a valve spring, and a valve seat which is part of an annular body held by a tubular body surrounding the control piston and secured to the housing, the annular body forming between it and the tubular body a return channel incorporating a check valve opening in the direction from the outlet to the inlet chamber, with the annular seal in abutment with a step in the housing and the annular body being in abutment with an inner flange of the tubular body.

A pressure control valve of this type has been disclosed in a copending U.S. patent application of J. Burgdorf, Ser. No. 288,633, filed July 30, 1981, assigned to the same assignee as the present application. The valve disclosed therein affords the advantage of a prefabricated valve unit adapted to be fitted into any type of housing. Because of the small diameter of the sealing elements, the frictional forces acting on the sealing elements are reduced. Further, ease of adjustment is provided by the spring being accessible from the outside.

Also, the overall axial length of this prior art valve is shorter than in other known pressure control valves, such as disclosed in German Patent DE-AS No. 15 80 148, where the valve parts have to be assembled in a bore of the valve housing and the spring is disposed between tha annular seal and the valve seat and has approximately the same diameter as these components.

SUMMARY OF THE INVENTION

It is an object of the present invention to provide a pressure control valve of the type initially referred to hereinabove which permits a very short axial length.

A feature of the present invention is the provision of a pressure control valve for a hydraulic brake system comprising a control piston having one end thereof guided through an annular seal and in a bore of the housing connected to atmosphere; the annular seal being in abutment with a step in the housing; a closure member carried by the piston adjacent the other end thereof; a support plate for engagement with a valve spring carried by the piston between the closure member and the other end of the piston; an annular body encircling the piston disposed adjacent the annular seal, the annular body providing a valve seat adjacent the closure member; a tubular body surrounding the annular body and fastened to the housing; a return channel disposed between the annular body and the tubular body having a check valve therein opening in the direction from an outlet chamber to an inlet chamber; and radial channels provided in a selected one of the annular body and a first clearance between the annular body and the annular seal.

In this construction, the valve seat is adjacent to the annular seal, resulting in a material reduction in the axial length of the control valve when compared to known construction. In addition, the control piston is shorter and, accordingly, better supported. For passage of the fluid, comparatively small channels suffice which have no substantial impact on the axial length. Moreover, the close vicinity offers possibilities to axially secure the annular seal and the annular body to the members fastened to the housing without necessitating additional arrangements.

The annular body may have an elastic profile ring forming both the valve seat and the closure member of the check valve. This simplifies the manufacture.

Further, the profile ring may be integrally formed with the annular seal. This results in a still further simplification of manufacture and an extraordinarily short axial length. In addition, the whole profile ring/annular seal unit is axially secured between the step on the housing and the inner flange of the tubular body.

It is recommended to provide the annular body, in addition to its elastic profile ring, with a rigid support ring on the side remote from the valve seat. Such a support ring prevents the elastic members from being excessively compressed in an axial direction.

With the elastic profile ring and the annular seal lying directly adjacent to each other, the support ring should be arranged with clearance between two further opposed surfaces of the profile ring and the annular seal. While permitting a certain amount of axial movement of the elastic parts on the one hand, this clearance prevents excessive compression on the other hand.

The radial channels may be formed by recesses in the elastic profile ring or- with the support ring interposed between elastic profile ring and ring seal-by recesses in the support ring.

In an embodiment of the invention, the annular body is axially secured in position by the inner flange of the tubular body and by an end surface of the housing. Another possibility is to secure the annular body axially in position by the inner flange of the tubular body and by the end surface of the annular seal. Conversely, the annular seal may be axially secured in position by a step in the housing and by an end surface of the annular body.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
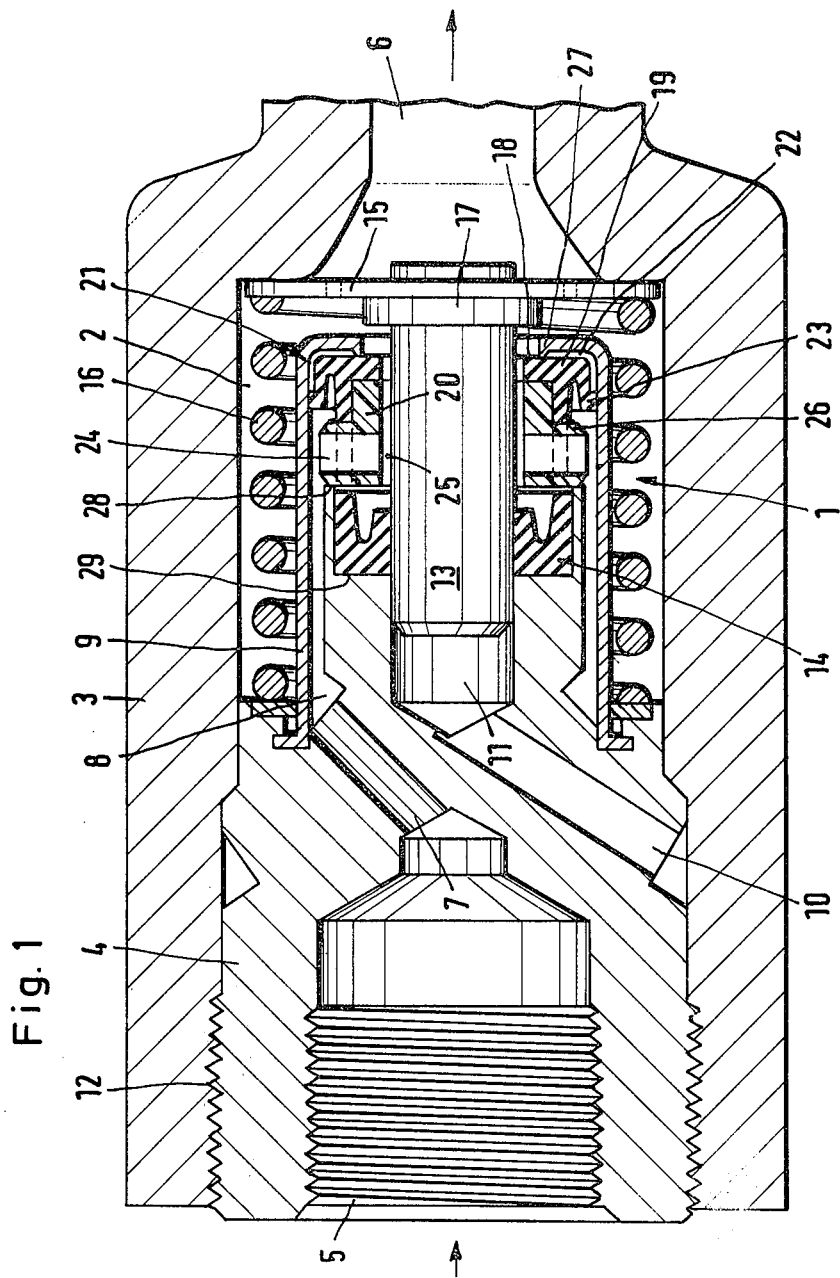
FIG. 1 is a longitudinal cross sectional view of a first embodiment of a pressure control valve in accordance with the principles of the present invention.

In the embodiment of FIG. 1, a pressure control valve unit 1 is incorporated into the inner space 2 of a member 3 of a vehicle brake system. The housing of the valve is a member 4 having as an inlet port 5 a threaded bore into which an inlet pipe may be threaded which as a rule extends from the master cylinder. Member 4 is threaded into member 3. Member 3 further possesses an outlet port 6.

Inlet port 5 communicates via a bore 7 with a chamber 8 formed between housing 4 and a tubular body 9 fastened thereto. Another channel 10 connects a housing bore 11 to atmosphere via thread 12. In housing bore 11, a control piston 13 is guided through, and sealed relative to, an annular seal 14. At its free end, control piston 13 carries a support plate 15 against which a valve spring 16 arranged outside the tubular body 9 bears with one end, while the other end of spring 16 rests against housing 4. Further, control piston 13 carries a closure member 17 cooperating with the end surface 18 of an elastic profile ring 19, end surface 18 acting as a valve seat. The elastic profile ring 19 and a support ring 20 of plastic material combine to form an annular body 21. Further, elastic profile ring 19 and tubular body 9 form the boundaries for a return channel 22, with a lip 23 cooperating with the tubular body 9 to form a check valve. The support ring 20 includes radial channels 24, and an axial channel 25 is bounded by support ring 20 and and control piston 13. These channels connect the inlet chamber 8 with the valve area and, with the valve in the open position, with outlet port 6.

Profile ring 19 and annular seal 14 are integrally formed. Channels 24 extend through radial arms 26 of support ring 20 which in turn extend through holes in the profile ring/annular seal unit. Annular body 21 is axially secured in position by abutting engagement of profile ring 19 with the flange 27 of tubular body 9 and further by abutting engagement of the radial arms 26 of support ring 20 with an end surface 28 of the housing 4. Annular seal 14 is axially secured in position by its abutting engagement with a step 29 in housing 4 on the one side and with support ring 20 on the other side. Annular seal 14 will continue to be axially secured also if it is not integrally formed with profile ring 19 but separated by a flange of support ring 20 through which flange the radial channels 24 extend.

If in operation, fluid under pressure is supplied through inlet port 5, it will pass freely through the valve to outlet port 6. With the input pressure increasing, thereby exceeding a predetermined magnitude, the valve will close against the force of valve spring 16 by closure member 17 moving into contact with valve seat 18. Thus, the input pressure will only act within a narrow annular strip within the valve seat 18, whereas the output pressure will act over the entire area of closure member 17. With the pressure continuing to increase on the inlet side, the valve will cause a reduced pressure increase at outlet port 6, this reduction corresponding to the surface ratio of control piston 13. When the input pressure drops below the output pressure, lip 23 will lift clear of tubular body 9. Via return channel 22 which is open in that particular instance, the pressure in the outlet chamber and the connected devices is allowed to decrease.

It will be apparent that the pressure control valve has a very short axial length. Also, it affords ease of assembly. Prior to assembly, tubular body 9 and its flange 27 are prefabricated. Annular seal 14 is inserted in step 29 and sealing members including annular body 21 are fitted through the open end of tubular body 9 which is subsequently fastened to housing 4, for example by means of caulking. Then valve spring 16 is inserted and compressed by means of support plate 15 until the desired initial tension is attained whereupon support plate 15 is fixed to control piston 13.

Figure 2:
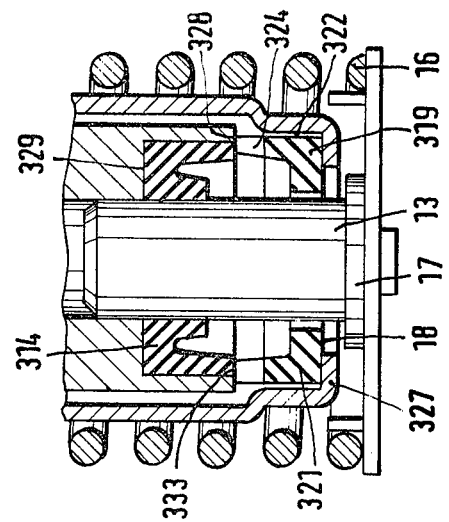
FIG. 2 is a partial longitudinal cross sectional view of a second embodiment of a pressure control valve in accordance with the principles of the present invention.

In the embodiment of FIG. 2, like parts are assigned like reference numerals, while modified parts carry reference numerals increased by 100. In this embodiment profile ring 119 and the annular seal 114 are integrally formed. However, the radial channels 124 are directly incorporated into this embodiment as follows. The support ring 120 is arranged with clearance between two opposed surfaces 130 and 131 of the profile ring 119 and the annular seal 114, respectively. Further, support ring 120 has its inside padded with textile material 132 to reduce friction. The mode of operation of the valve comprising closure member 17 and valve seat 18 is the same as in FIG. 1. However, the check valve for opening the return channel 122 operates such that the profile ring 119 will lift clear of the flange 127 of tubular body 9 in the presence of an excess pressure on the outlet side. The unit comprising profile ring 119 and annular seal 114 is axially secured in position by being held between the inner flange 127 and a step 129 in housing 4.

Figure 3:
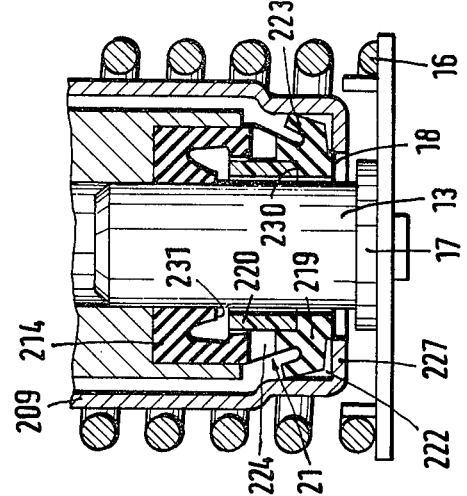
FIG. 3 is a partial longitudinal cross sectional view of a third embodiment of a pressure control valve in accordance with the principles of the present invention.

In the embodiment of FIG. 3, like parts are assigned like reference numerals as in FIG. 1, while modified parts carry reference numerals increased by 200. Annular seal 214 and profile ring 219 form again a unit through which radial channels 224 extend. The support ring is formed by a sleeve 220 arranged with clearance between two opposed surfaces 230 and 231 of profile ring 219 and annular seal 214, respectively. Axial securing is accomplished in the same manner as in FIG. 2. The control valve operation and the check valve operation corresponds to that of FIG. 1.

Figure 4:
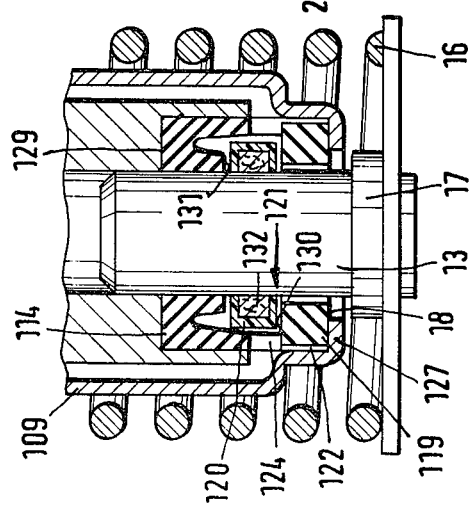
FIG. 4 is a partial longitudinal cross sectional view of a fourth embodiment of a pressure control valve in accordance with the principles of the present invention.

In the embodiment of FIG. 4, like parts are assigned like reference numerals as in FIG. 1, while modified parts carry reference numerals increased by 300. In this embodiment, the annular seal 314 is manufactured separately from the annular body 321 which in this particular case consists of the profile ring 319 only. The radial channels 324 are formed by recesses in the profile ring 319. The profile ring 319 is axially secured in place between the inner flange 327 of tubular body 9 and an end surface 328 of housing 4. The annular seal 314 is axially secured by a step 329 in housing 4 and the end surface 333 of the profile ring 319. The mode of operation of this control valve corresponds to all embodiments previously described and the operation of the check valve corresponds to that of FIG. 2.

While I have described above the principles of my invention in connection with specific apparatus, it is to be clearly understood that this description is made only by way of example and not as a limitation to the scope of my invention as set forth in the objects thereof and in the accompanying claims.

I claim:
1. A pressure control valve for a hydraulic brake system comprising:
 a control piston having one end thereof guided through an annular seal and in a bore of said housing connected to atmosphere; said annular seal being in abutment with a step in said housing;
 a closure member carried by said piston adjacent the other end thereof;
 a support plate for engagement with a valve spring carried by said piston between said closure member and said other end of said piston;

an annular body encircling said piston disposed adjacent said annular seal, said annular body providing a valve seat adjacent said closure member;

a tubular body surrounding said annular body and fastened to said housing;

a return channel disposed between said annular body and said tubular body having a check valve therein opening in the direction from an outlet chamber to an inlet chamber; and radial channels provided in a selected one of said annular body and a first clearance between said annular body and said annular seal.

2. A control valve according to claim 1, wherein
said annular body includes an elastic profile ring to provide both said valve seat and a check valve closure member.

3. A control valve according to claim 2, wherein
said profile ring is integrally formed with said annular seal.

4. A control valve according to claim 3, wherein
said annular body further includes a rigid support ring disposed on a side of said profile ring remote from said valve seat.

5. A control valve according to claim 2, wherein
said annular body further includes a rigid support ring disposed on a side of said profile ring remote from said valve seat.

6. A control valve according to claims 4 or 5, wherein
said profile ring and said annular seal are disposed directly adjacent one another to provide said first clearance, said support ring is disposed to have a second clearance between itself and two further opposing surfaces of said profile ring and said annular seal, and said radial channels include said first and second clearances.

7. A control valve according to claim 6, wherein
said annular body is secured in an axial position by an inwardly extending flange of said tubular body adjacent said closure member and an adjacent end surface of said annular seal.

8. A control valve according to claims 4 or 5, wherein
said radial channels include recesses in said support ring.

9. A control valve according to claim 8, wherein
said annular body is secured in an axial position by an inwardly extending flange of said tubular body adjacent said closure member and an adjacent end surface of said housing.

10. A control valve according to claims 2, 3, 4 or 5, wherein
said radial channels include recesses in said profile ring.

11. A control valve according to claim 10, wherein
said annular seal is secured in an axial position by said step in said housing and by an adjacent end surface of said profile ring.

12. A control valve according to claims 1, 2, 3, 4 or 5, wherein
said annular body is secured in an axial position by an inwardly extending flange of said tubular body adjacent said closure member and an adjacent end surface of said annular seal.

13. A control valve according to claims 1, 2, 3, 4 or 5, wherein
said annular body is secured in an axial position by an inwardly extending flange of said tubular body adjacent said closure member and an adjacent end surface of said housing.

14. A control valve according to claims 2, 3, 4 or 5, wherein
said annular seal is secured in an axial position by said step in said housing and by an adjacent end surface of said profile ring.

15. A control valve according to claims 1, 2, 3, 4 or 5, wherein
said annular seal is secured in an axial position by said step in said housing and by an adjacent end surface of said annular body.

* * * * *